Oct. 20, 1936.   R. G. FERRIS   2,058,142
STANCHION
Filed Feb. 25, 1935    2 Sheets-Sheet 2
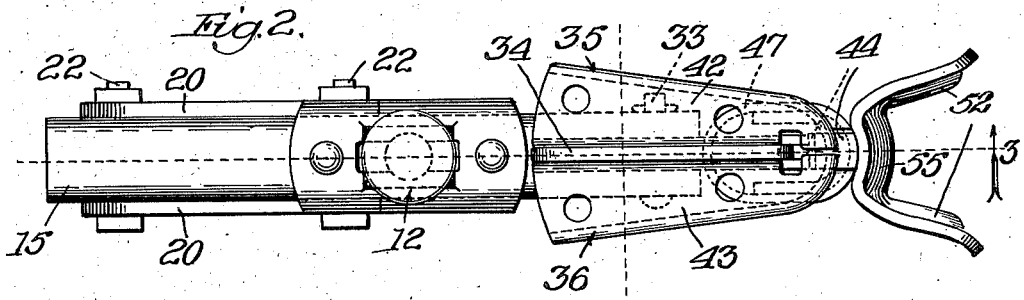
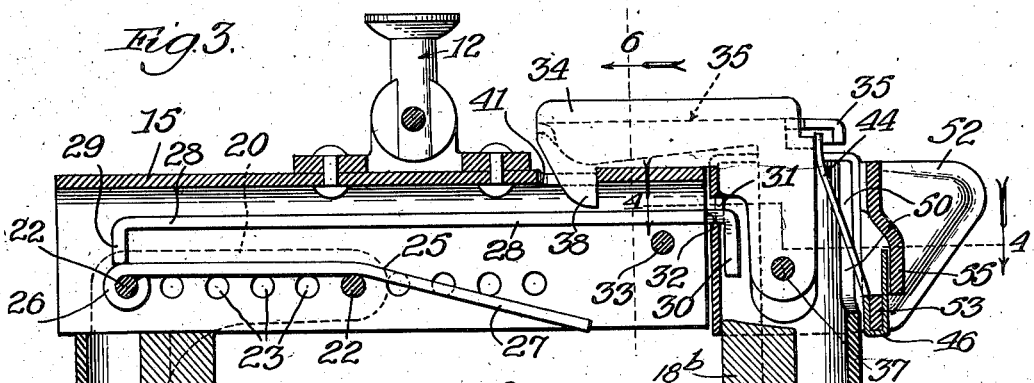
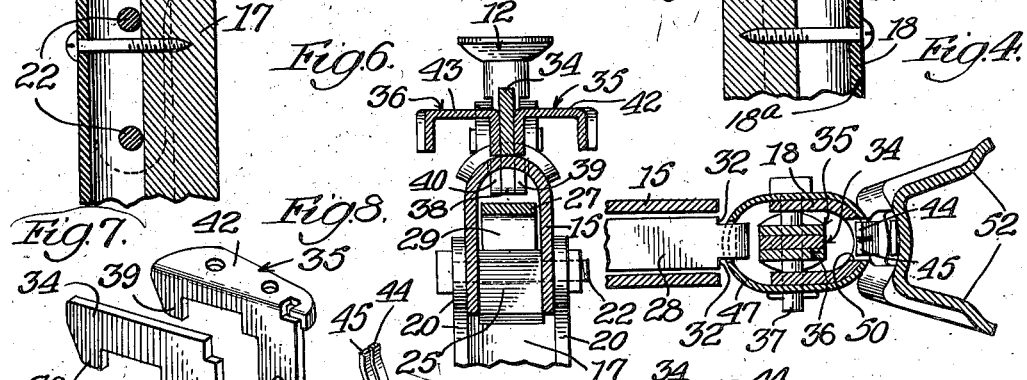
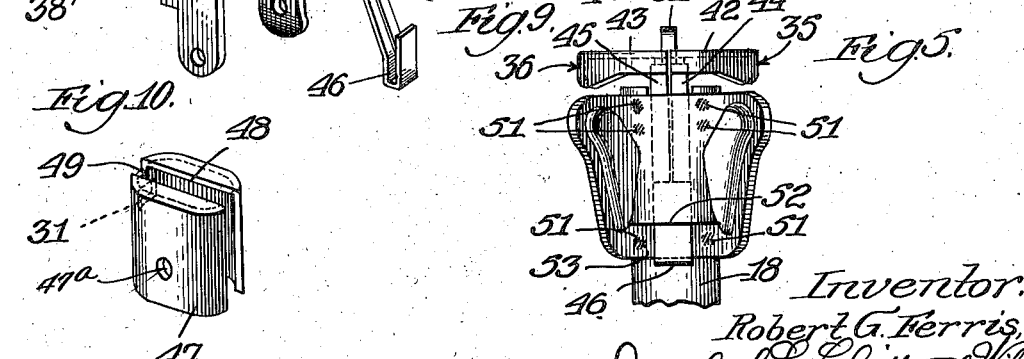
Inventor:
Robert G. Ferris
By Dyrenforth, Lee, Chritton & Wiles
Attys.

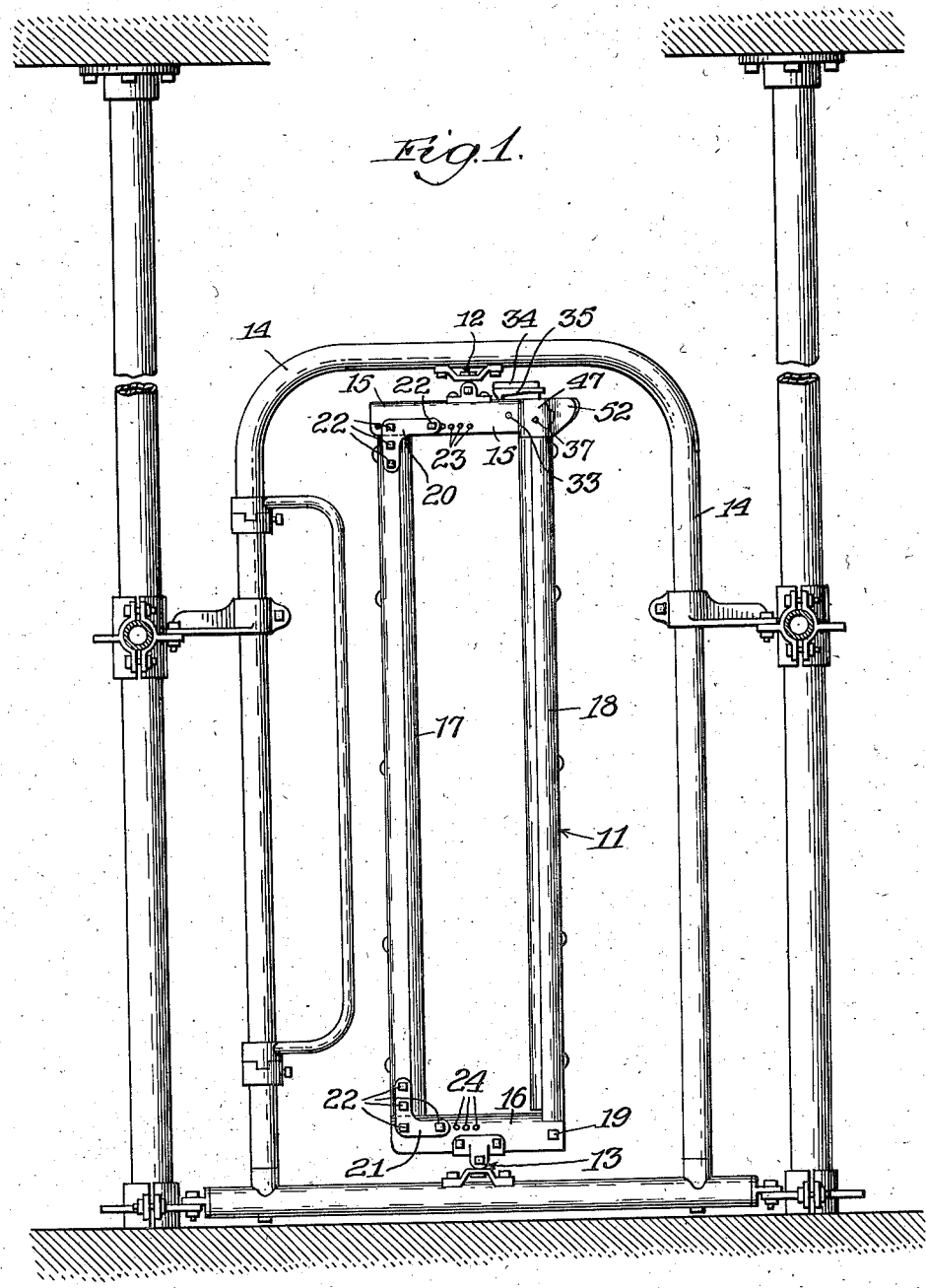

Patented Oct. 20, 1936

2,058,142

UNITED STATES PATENT OFFICE 2,058,142

STANCHION

Robert G. Ferris, Harvard, Ill., assignor to Starline, Inc., Harvard, Ill., a corporation of Illinois Application February 25, 1935, Serial No. 8,130

16 Claims. (Cl. 119—150)

My primary object is to provide improvements in the means for releasably locking the movable sides of stanchions in closed position, more especially with a view to preventing the movement of the locking means to releasing position by the movements of the animals secured in the stanchions, while permitting of the ready releasing of the locking means when desired by the operator.

Referring to the accompanying drawings:

Figure 1 is a view in front elevation of a stanchion embodying my invention mounted in a stall front.

Figure 2 is a plan view of the stanchion of Fig. 1.

Figure 3 is a section taken at the line 3 on Fig. 2 and viewed in the direction of the arrow.

Figure 4 is a broken plan section taken at the irregular line 4—4 on Fig. 3 and viewed in the direction of the arrows.

Figure 5 is an end view of the structure shown in Figs. 2-4 viewing it from the right in these figures.

Figure 6 is a section taken at the line 6 on Figs. 2 and 3 and viewed in the direction of the arrow.

Figures 7 and 8 are perspective views of certain of the latch-lever sections of the locking means shown in the preceding figures.

Figure 9 is a perspective view of a spring forming a part of the locking mechanism; and Figure 10, a perspective view of a ferrule provided on the upper end of the movable stanchion side.

In the construction shown 11 represents a stanchion pivotally mounted at its upper and lower ends at 12 and 13, respectively, to swing in a horizontal plane, in the stationary frame 14 of a stall front.

The stanchion shown comprises top and bottom members 15 and 16 connected together by means of a fixed side bar 17 and having a movable side bar 18 hingedly connected at 19 to the cross member 16.

The top cross member 15 is in the form of an inverted channel, the side bar 17 extending at its upper and lower ends in abutting relationship to the underside and the top side, respectively, of the members 15 and 16.

The bar 17 is connected with the members 15 and 16 by means of angle plates 20 and 21 arranged at opposite sides of the joints between the bar 17 and the members 15 and 16, and bolts 22 extending through these parts, the members 15 and 16 containing horizontal series of openings 23 and 24, respectively, to receive certain of the bolts 22 thereby permitting of the securing of the bar 17 at different positions along the members 15 and 16 to cause the stanchion to be adjusted for animals having necks of different widths.

The channel member 15 contains means for preventing the crushing of the channel in the tightening of the bolts 22. The means shown for this purpose comprise a plate 25 of substantially the same width as the channel member 15, this plate having an eye 26 adjacent the bar 17 at which it is supported on one of the bolts 22 and extending toward the hinged frame bar 18 and resting on one of the other of these bolts, its terminal end, beyond the last-referred-to bolt, being downwardly inclined, as represented at 27.

Extending into the channel of the member 15 is a bar 28 having down turned end portions 29 and 30, the latter being of less width than the bar 28. The bar at its down turned end 30 extends through a slot 31 in the bar 18 and is constrained, by the down turned end 30 and the shoulders 32 adjacent thereto, to move with the bar 18. The bar 28 rests, and is slidable on, a stop pin 33 on the member 15, the down turned end 29 engaging the pin 33 to limit the outward swinging of the side bar 18.

The structure also comprises latch means for releasably locking the releasable side bar 18 in the closed position shown in the drawings, these latch means, in accordance with the preferred illustrated embodiment of my invention, comprising a latch lever formed of three separately operable latch sections 34, 35 and 36 each in the form of a bell crank and extending downwardly into the hollow upper end of the bar 18. The latch sections 34, 35 and 36 are flatwise opposed and are pivoted at the lower ends of their vertical legs on a horizontal pivot pin 37 secured to the bar 18, the outer ends of their horizontal portions having latch lugs 38, 39 and 40, respectively, adapted to enter a notch 41 in the top of the member 15 and hold the side bar 18 in closed position.

The intermediate latch section 34 is shown as of flat plate form whereas the side latch sections 35 and 36, provided of the same form except as rights and lefts, have outwardly extending angle flanges 42 and 43, respectively.

The latch sections 34, 35 and 36 are constantly urged toward latching position by springs 44 and 45 shown as of leaf form and integral with a U-shaped clip portion 46 at which the springs are secured in position on the bar 18. The spring 44 laps the latch sections 34 and 35 and the spring 45 laps the latch sections 34 and 36. Thus the latch section 34 is held spring pressed in latched position in the movement of either one of the latch sections 35 and 36, it being necessary to rock all three of the latch sections out of locking position to release the side bar 18 for outward swinging movement.

The upper end of the side bar 18, the body portion of which is shown as formed of a channel bar 18ª and a shorter solid bar 18ᵇ, is provided with a ferrule 47 in which the slot 31 is provided. The ferrule 47 is closed at its top except for a slot 48 which extends down one side of the ferrule to afford a seat 49 for the latch sections and down the opposite side thereof through its lower edge, this portion of the slot registering with a slot 50 of somewhat less length in the bar 18, and into which slots the springs 44 and 45 extend.

The pin 37 extends through the ferrule 47 which is clamped to the top of the bar 18 by spot-welding it, as for example as represented at 51, to a yoke member 52 as commonly provided in structures of this character.

The springs are held in place by engaging the clip portion 46 of the spring-device with a cross-bar 53 on the yoke member 52 which is formed as by slitting the yoke along the line 54 and outwardly deflecting the metal above it as shown at 55, the clip portion 46 gripping the bar 53 under spring tension. The arrangement of these parts is such, as shown, that the spring device may be readily removed and replaced by a similar device in case of impairment of the spring device, without requiring the dismantling of other parts of the structure.

To move the locking mechanism to released position, the operator clasps the structure comprising the three latch sections 34, 35 and 36, (thus drawing these sections flatwise together) and then lifts them thereby rocking all three sections, as a unit, to released position permitting the movable stanchion side 18 to swing outwardly to open position.

As will be understood, the actuation of the latch mechanism out of latched position by the movements of an animal in the stanchion will be impossible. Even if the animal should accidentally lift either one of the outer latch sections, the intermediate latch section and the other outer latch section will be held in latched position by the one of the springs cooperating therewith, thus preventing opening up of the stanchion.

As shown the ferrule 47 is of symmetrical oval shape in cross section with the opening therein and receiving the pin 37 and represented at 47ª located midway between its opposite sides. Thus the bar 18 may be assembled with the ferrule 47 either in the position shown wherein the closed side of the bar 18 is outermost, or in a reversed position in which said side is innermost, the latter positioning of the bar being desired in case the bar portion 18ᵇ is omitted. The provision of the slot 50 opposite the slotted, or open, side of the channel 18ª, adapts the bar 18ª to receive into it both the depending end 30 of the member 28 and the spring 44 not only when the channel bar 18ª is positioned in the ferrule as shown, but also when this bar is reversed to the position above stated.

While I have illustrated and described a particular construction embodying my invention I do not wish to be understood as intending to limit it thereto as the same may be variously modified and altered without departing from the spirit of my invention.

What I claim as new, and desire to secure by Letters Patent, is:

1. A stanchion comprising a top member, a movable side bar, and latch means for locking said side bar in a certain position comprising a plurality of latch sections supported for substantially parallel separate movement into and out of locking position.

2. A stanchion comprising a top member, a movable side bar, and latch means for locking said side bar in a certain position comprising a plurality of latch sections supported for substantially parallel separate rocking movement into and out of locking position.

3. A stanchion comprising a top member, a movable side bar, and latch means for locking said side bar in a certain position comprising a plurality of latch sections supported for substantially parallel separate movement in substantially vertical planes into and out of locking position.

4. A stanchion comprising a top member, a movable side bar, and latch means for locking said side bar in a certain position comprising a plurality of latch sections supported for substantially parallel separate movement into and out of locking position, and separate spring means releasably holding said sections in locking position.

5. A stanchion comprising a top member, a movable side bar, and latch means for locking said side bar in a certain position comprising outer latch sections and an intermediate latch section, all of said sections being supported for substantially parallel separate movement into and out of locking position.

6. A stanchion comprising a top member, a movable side bar, and latch means for locking said side bar in a certain position comprising outer latch sections and an intermediate latch section, all of said sections being pivotally supported for substantially parallel separate movement into and out of locking position.

7. A stanchion comprising a top member, a movable side bar, and latch means for locking said side bar in a certain position comprising outer latch sections and an intermediate latch section, all of said sections being supported for substantially parallel separate movement into and out of locking position, and springs one of which urges said intermediate latch section and one of said outer latch sections toward latching position and the other of which urges said intermediate latch section and the other of said outer latch sections toward latching position.

8. A stanchion comprising a top member, a movable side bar, and latch means for locking said side bar in a certain position, said bar being hollow at its upper end and having a slot and said latch means comprising a movable latching member and a spring urging said member to latching position and having a clip portion, said side bar having a bar portion adjacent said slot, said latching member extending into said bar adjacent the slot therein, said clip portion releasably engaging said bar portion for support, and said spring being located in alinement with said slot.

9. A stanchion comprising a top member, a movable side bar, and latch means for releasably locking said side bar in a certain position, said side bar comprising a member hollow at its upper end and having diametrically disposed slots therein and a ferrule adapted to receive the upper end of said hollow member in the positioning of the latter with either of its slots to the outside of the stanchion, said latch means comprising a latching member and a spring engaging therewith and extending into the ferrule and in alinement with the one of the slots in said hollow member adjacent thereto.

10. A stanchion comprising a top member, a movable side bar, latch means for releasably locking said side bar in a certain position, said side bar comprising a member hollow at its upper end and having diametrically disposed slots therein and a ferrule adapted to receive the upper end of said hollow member in the positioning of the latter with either of its slots to the outside of the stanchion, said latch means comprising a latching member and a spring engaging therewith and alined with the one of the slots in said hollow member adjacent thereto, and a stop bar extending lengthwise of said top member and having a projection on an end thereof, said stop bar at its projection-equipped end being alined with the one of the slots in said hollow member adjacent thereto and interlocked at said end with said ferrule.

11. A stanchion comprising a top member, a movable side bar, and latch means for releasably locking said side bar in a certain position, said side bar comprising a member hollow at its upper end, a ferrule extending over the upper end of said hollow member, and a pin connecting said ferrule with said hollow member, said latch means comprising a latching member extending downwardly into said hollow member and pivoted on said pin.

12. A stanchion comprising a top member, a movable side bar, and latch means for releasably locking said side bar in a certain position, said side bar comprising a member hollow at its upper end and a ferrule on the upper end of said hollow member, a yoke connected with said ferrule and having outwardly extending spaced apart ears and slitted and deflected to form a cross bar, said ferrule and hollow member having registering side openings and said latch means comprising a latching member and a spring having a portion engaging said cross bar and deflected portion of said yoke and a portion engaging said latching member.

13. A stanchion comprising a top member, a movable side bar, latch means for releasably locking said side bar in a certain position, said side bar comprising a member hollow at its upper end and having diametrically disposed slots therein and a ferrule adapted to receive the upper end of said hollow member in the positioning of the latter with either of its slots to the outside of the stanchion, said latch means comprising a latching member and a spring engaging therewith and alined with the one of the slots in said hollow member adjacent thereto, and a stop bar extending lengthwise of said top member and having a projection on an end thereof, said ferrule having an opening at its innermost side extending above the bottoms of the slots in said side bar, said stop bar at its projection-equipped end being alined with the one of the slots in said hollow member adjacent thereto and extending into said opening in said ferrule and interlocked at said end with the latter.

14. A stanchion comprising a top member, a movable side bar, and latch means for locking said side bar in a certain position, said bar being hollow at its upper end and having a slot in its side wall and said latch means comprising a movable latching member and a spring urging said latching member toward latching position, said latching member having a depending portion extending downwardly into said bar through the upper end of the latter and said spring being secured to said bar at the exterior thereof and extending in alinement with said slot into engagement with said latch.

15. A stanchion comprising a top member, a movable side bar, said top member having a portion for interlocking with a latch, latch means releasably engaging said portion for locking said side bar in a certain position, said side bar being hollow and of general U-shape in cross section and containing pin-receiving openings in its opposed side walls, a ferrule adapted to receive the upper end of said side bar in the positioning of the latter with its open side either to the outside or the inside of the stanchion, and pivoting means for said latch means in said openings, the parts being so constructed and arranged that said openings will occupy coincident positions, and thus extend at the same distance from the portion of said top bar with which said latch means engages, when the slotted wall of said side bar is positioned either at the outside or the inside of said stanchion.

16. A stanchion comprising a top member, a movable side bar, and latch means for locking said side bar in a certain position, said bar being hollow at its upper end and having a slot in its side wall and said latch means comprising a movable latching member and a spring urging said latching member toward latching position, said latching member having a latching portion at which it engages said top member and a depending portion extending downwardly into said bar through the upper end of the latter, said latching member being pivoted at said depending portion to said side bar below said latching portion and said spring being secured to said bar at the exterior thereof and extending in alinement with said slot and engaging said latching member above its pivot.

ROBT. G. FERRIS.